United States Patent [19]

Stoughton

[11] Patent Number: 4,654,717
[45] Date of Patent: Mar. 31, 1987

[54] CATHODE-RAY TUBE ARC-OVER PROTECTION FOR DIGITAL DATA IN TELEVISION DISPLAY APPARATUS

[75] Inventor: John W. Stoughton, Indianapolis, Ind.

[73] Assignee: RCA Corporation, Princeton, N.J.

[21] Appl. No.: 735,979

[22] Filed: May 20, 1985

[51] Int. Cl.[4] ............ H04N 50/68; H04N 9/16; H04N 5/65; H04N 5/57
[52] U.S. Cl. .................... 358/243; 358/74; 358/245; 358/190; 358/169; 358/168
[58] Field of Search ............ 358/188, 190, 245, 242, 358/64, 74, 243, 164, 166, 168, 169, 174; 315/379, 411; 371/7, 12, 13, 14

[56] References Cited

U.S. PATENT DOCUMENTS

| | | | |
|---|---|---|---|
| 3,767,951 | 10/1973 | Dumas et al. | 313/51 |
| 4,064,454 | 12/1977 | Yoshino et al. | 324/54 |
| 4,207,493 | 6/1980 | Förster | 315/3 |
| 4,253,110 | 2/1981 | Harwood et al. | 358/169 |
| 4,520,397 | 5/1985 | Hibi | 358/243 |
| 4,521,811 | 6/1985 | Stoughton et al. | 358/243 |
| 4,523,295 | 6/1985 | Zato | 358/190 |

FOREIGN PATENT DOCUMENTS 0178865  4/1986  European Pat. Off. .
61-99477  5/1986  Japan .

OTHER PUBLICATIONS

DIGIT 2000 VLSI Digital TV System, ITT Intermetall, 1983, pp. 5–9

*Primary Examiner*—James J. Groody
*Assistant Examiner*—Cynthia Smith
*Attorney, Agent, or Firm*—E. M. Whitacre; P. J. Rasmussen; K. N. Nigon

[57] ABSTRACT

Arc-over in the cathode ray tube of a digital television receiver produces a large current pulse which, when it discharges via the chassis ground, disrupts the reference ground potentials of other circuitry coupled to the chassis ground. The affected circuitry includes digital data storage elements which may experience random state changes caused by the fluctuating ground potential. The CRT arc-over condition is detected by circuitry which applies a pulse to the reset terminal of the microprocessor, causing it to restore the potentially corrupted data in the data storage elements using preset data stored in a less volatile programmable read only memory.

11 Claims, 4 Drawing Figures

CATHODE-RAY TUBE ARC-OVER PROTECTION FOR DIGITAL DATA IN TELEVISION DISPLAY APPARATUS

The present invention relates to apparatus for detecting arc-over conditions in the cathode-ray tube (CRT) of a television display and for reestablishing any digital data which may have been corrupted by the arc-over conditions.

Accelerating potential or ultor voltage for the electron beams within a CRT is generated by rectification of an alternating current voltage and coupling the rectified voltage to the ultor electrode of the CRT. The ultor electrode is coupled to an ultor inner conductive coating of the CRT envelope. The inner coating forms one plate of an ultor capacitor. An ultor outer conductive coating forms the other plate which serves as the ultor ground return terminal for ultor current.

The anode electrode of the electron gun is connected to the inner conductive coating, typically by means of spring contacts. The ultor accelerating potential serves as an energizing voltage for the anode electrode. Energizing voltages for the other electrodes, such as the screen, grid, and cathode electrodes, are developed by associated energizing circuitry external to the CRT. Connecting pins at the base of the CRT couple the energizing voltages to the associated electron gun electrodes.

One of the pins at the base of the CRT, for example, one of the filament pins, may serve as the ground return base pin for ultor current. This pin is connected both to ground and to the ultor outer conductive coating. Typical termination structure to the outer coating from the ground return base pin may comprise a U-shaped braid of copper wire closely pressed over the outer conductive coating on the CRT envelope. One or several copper wires connect various points along the copper braid to the ground return base pin. The ground return base pin is also connected by a copper wire to the common ground current return terminal of the energizing circuitry or to a chassis grounding terminal if the energizing circuitry and chassis have mutual ground current returns.

CRT arc-over is a spontaneous condition in which the ultor voltage across the ultor capacitor may be coupled to several of the connecting base pins, thereby subjecting the energizing circuitry and other circuitry sharing common current return paths to overvoltages from the relatively low impedance ultor capacitor source. Sensitive semiconductor devices may be damaged due to the overvoltages developed, and the relatively large arc-over currents flowing in the chassis and energizing circuitry.

Conventional techniques for arc-over protection involve shunting the arc-over current away from the energizing circuitry directly to the ultor ground return terminal through a spark gap coupled to the cathode ray tube connecting base pins. Relatively high impedance resistors may also be coupled between various ones of the base pins and the energizing circuitry to provide a voltage drop across the resistor for limiting arc-over voltages.

Nevertheless, arc-over current oscillation within the energizing circuitry may still develop. Stray capacity between the ultor ground return terminal and the chassis or energizing circuitry may provide a sufficiently low impedance AC current path from the ground return base pin to sustain relatively large and undesirable arc-over current oscillations.

CRT arc-over oscillations may temporarily raise the ground potential well over its nominal value throughout the television display circuitry. These perturbations in ground potential may randomly change the states of digital data storage elements such as registers of flip-flops or random-access memories (RAM's) and corrupt the data which they hold.

In conventional digital television receivers, the settings of viewer controls such as audio volume, brightness, tint, and saturation are held in digital data storage elements. A random corruption of these values is analogous to randomly turning the corresponding user control potentiometers on an analog television receiver.

SUMMARY OF THE INVENTION

The present invention includes apparatus for detecting the occurrence of a CRT arc-over condition in a non-intrusive manner and for reestablishing the values of any digital data that is potentially affected by the arc-over condition.

DESCRIPTION OF THE INVENTION

Figure 1:
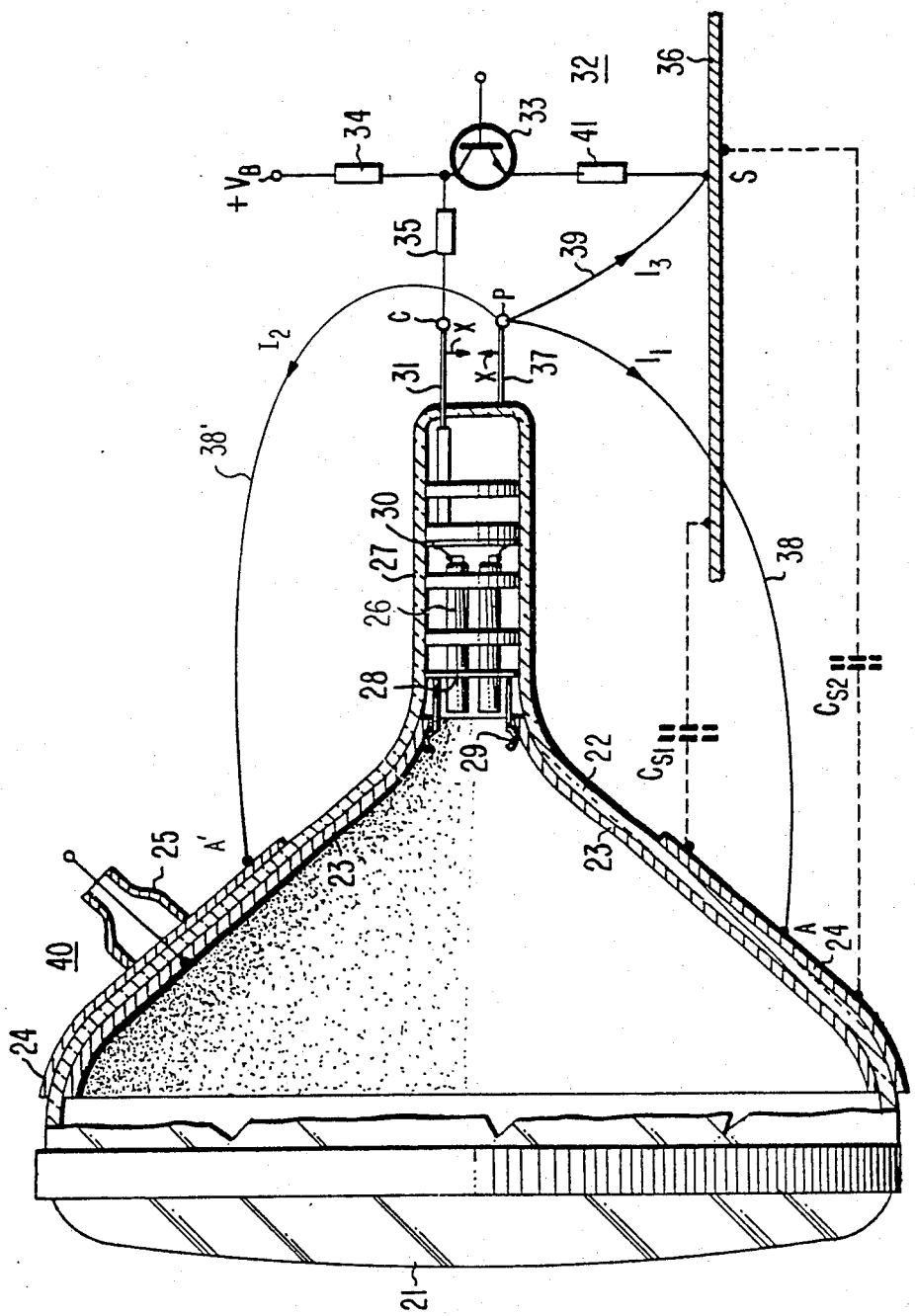
FIG. 1 is a partial view of a cathode ray tube and a schematic diagram of associated circuitry which is useful in explaining the environment of the invention.

As illustrated in the partially schematic FIG. 1, a CRT 21, of a television receiver, for example, includes a glass envelope 22, an inner conductive coating 23 and an outer conductive coating 24. Coatings 23 and 24 form the plates or electrodes of an ultor capacitor 40. During operation of the television receiver, a high voltage accelerating potential is developed across ultor capacitor 40. An alternating current voltage, such as developed by a flyback transformer, not illustrated, is rectified and coupled to inner coating 23 through a conventional ultor high voltage termination structure 25.

A conventional electron gun structure 26 is located in the interior of the neck portion 27 of the CRT envelope 22. A spring contact 29 connects inner coating 23 to an anode electrode 28 of electron gun 26. The ultor high voltage provides the energizing voltage for the anode electrode 28.

Energizing voltages for the other electrodes of electron gun 26, such as the focus and screen electrodes, are coupled through other base pins from energizing circuitry associated with the cathode ray tube and other television receiver components. As illustrated in FIG. 1, energizing voltage for the cathode electrode 30, for example, is coupled through a cathode base pin 31 from a video output energizing circuit 32, only partially illustrated.

Video output circuit 32 includes a driver transistor 33 coupled to a DC voltage source $+V_B$ through a resistor 34. Video input signals are coupled to the base of transistor 33 from conventional video processing circuitry not illustrated. Cathode drive signals at the collector of transistor 33 are coupled to cathode base pin 31 through a resistor 35. The termination from energizing circuit 32 to base pin 31 may be conventional and is indicated generally by a solder terminal C.

The emitter of transistor 33 is coupled to a common ground current return terminal S of energizing circuit 32 through a resistor 41. Such common return terminal S may be located on a frame or chassis 36 or on a separate printed circuit board, with the printed circuit board and chassis sharing mutual ground return paths.

Other electrode base pins, not illustrated, may be electrically interconnected with their respective energizing circuits in a manner similar to that described for the cathode base pin 31.

The outer conductive coating 24 serves as the ultor current return terminal. Electrical connection is provided from ground return base pin 37, which, for example, is coupled by a spark gap to the cathode base pin 31, to the ultor outer conductive coating 24 and to either chassis 36 ground as illustrated in FIG. 1 or to the common current return terminals of the energizing circuitry for electron gun 26, not illustrated. Typically, conductor lengths 38, 38' and 39 are connected between base pin 37 and two different points on the outer coating 24, and between base pin 37 and chassis ground, respectively. The termination structures for the conductor lengths 38, 38' and 39 to base pin 37, outer conductive coating 24, and chassis 36 ground may be conventional and are indicated generally in FIG. 1 by respective solder terminals P, A, A' and common return terminal S.

Conductor lengths 38 and 38' form a first direct current path from ground base pin 37 to the ultor current return terminals of outer coating 24. Conductor length 39 forms a second direct current path from ground base pin 37 to the chassis or energizing circuitry common current return termnal S.

An AC current path for CRT arc-over currents between chassis 36 and the ultor current return terminal of outer coating 24 is formed by means of the stray capacitance between chassis 36 and outer coating 24, as illustrated in FIG. 1 by capacitors $C_{S1}$ and $C_{S2}$. Although only $C_{S1}$ and $C_{S2}$ are illustrated, the stray capacitance of the chassis is distributed over the entire structure of chassis 36 and may be represented by a capacitor $C_S$ of a circuit 50, schematically illustrated in FIG. 2.

Figure 2:
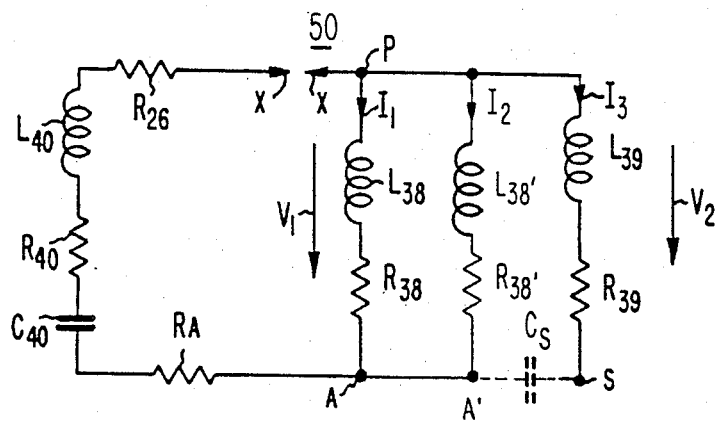
FIG. 2 is a schematic diagram illustrating an equivalent circuit of the structure shown in FIG. 1.

In FIG. 2, circuit 50 represents an electrical schematic of the arc-over current paths between terminal C and the external plate 24 of the ultor capacitor (terminal A) between terminal P and terminal A, between terminal P and common return terminal S and between terminal A and terminal S. Elements $L_{38}$ and $R_{38}$ represent the inherent inductance and resistance of conductor 38; $L_{38}'$ and $R_{38}'$, the inherent inductance and resistance of conductor 38' and $L_{39}$ and $R_{39}$ the inherent inductance and resistance of conductor 39. Inductor $L_{40}$, resistor $R_{40}$ and capacitor $C_{40}$ represent, respectively, the ultor inductance, resistance and capacitance. Resistor R26 represents the resistance of the termination structure between the electron gun 26 and the inner coating 23. $R_A$ represents the resistance of the outer conductive coating and the copper braid termination structure. Terminals A and A' are connected at separate points on this terminal structure. While there is some resistance and inductance inherent in this terminal structure, it is negligible, under arc-over conditions, when compared to the illustrated elements of the equivalent circuit 50. Accordingly, the path between points A and A' is modeled as a conductor. The capacitor $C_S$, shown in phantom, represents the distributed capacitance between the outer conductive coating 24 and the chassis 36.

As illustrated by the arrows X—X in FIG. 1, arc-over may occur between cathode base pin 31 and ground return base pin 37. Much of the ultor voltage will be coupled to terminals P and C. First and second arc-over currents $I_1$ and $I_2$ will flow in conductors 38 and 38' to provide the discharge path for ultor return current. As illustrated in FIG. 2, a voltage $V_1$ is developed between terminal P and terminal A, the termination of outer coating 24. This voltage will be developed across the parallel impedances of the inductor $L_{38}$ and resistor $R_{38}$ and the inductor $L_{38}'$ and resistor $R_{38}'$.

The voltage $V_1$ acts as a driving potential during arc-over and generates a second oscillatory arc-over current $I_3$ flowing in conductor 39, chassis 36, and the ground current return paths of the electron gun electrode energizing circuitry. As illustrated in FIG. 2 the normally underdamped oscillatory current $I_3$ is coupled to ultor ground return terminal A by means of the stray capacitance $C_S$. A voltage $V_2$ from terminal P to terminal S is produced by current $I_3$ across the series impedance of an inductor $L_{39}$ and resistor $R_{39}$.

Figure 3:
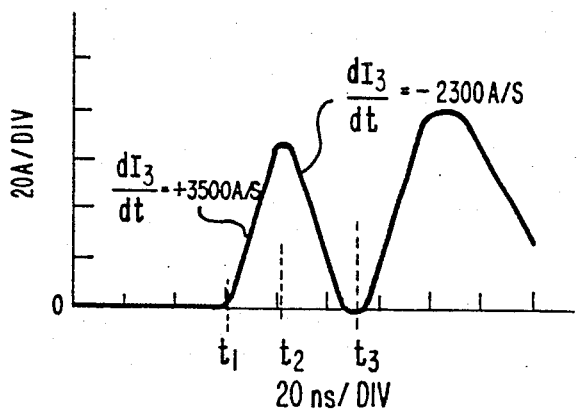
FIG. 3 is a graph of current versus time which illustrates a waveform useful in describing the structure shown in FIG. 1.

The underdamped oscillatory current $I_3$ is illustrated in FIG. 3 during typical arc-over situations. Arc-over begins near time $t_1$ creating current $I_3$ which oscillates for several cycles, reaching a first maximum near time $t_2$ and a first minimum near time $t_3$.

With oscillatory current $I_3$ as illustrated in FIG. 3, the voltage $V_2$ will assume relatively large values of both positive and negative magnitudes. The positive peak magnitude will be produced by the resistive voltage drop developed across $R_{39}$ and also by the positive inductive voltage drop developed across $L_{39}$ caused by the relatively large current change, $+dI_3/dt$, during the interval $t_1$-$t_2$, for example. A relatively large negative peak magnitude for voltage $V_2$ will be produced by the negative inductive voltage drop developed across $L_{39}$ caused by the relatively large current change, $-dI_3/dt$, during the interval $t_2$-$t_3$.

Oscillatory currents similar to $I_3$, caused by arc-over conditions may flow in other circuitry having a common ground return path with chassis 36. These currents may cause this circuitry to develop voltages with relatively large positive and negative magnitudes. Voltages of this sort, applied to the ground connection of digital data storage elements such as metal-oxidesemiconductor (MOS) flip-flops, may randomly change the values of data stored in these elements.

Figure 4:
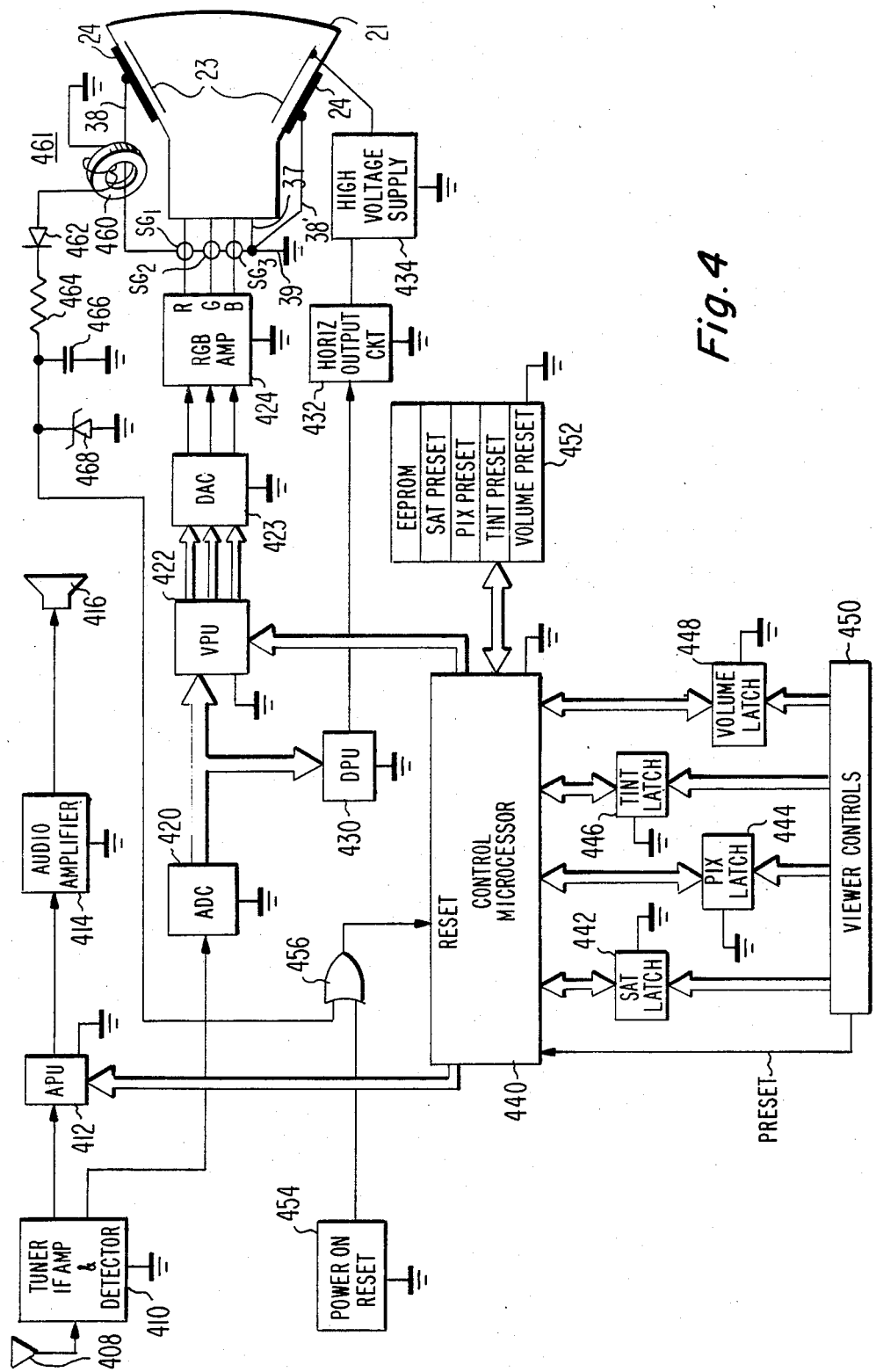
FIG. 4 is a block diagram, partially in schematic form, of a digital television receiver including data protection apparatus embodying the present invention.

FIG. 4 illustrates a digital television receiver in which the values of the viewer controls for audio volume, image brightness, color tint and color saturation are held in digital data storage elements. The illustrated receiver also includes circuitry to detect the occurrence of a CRT arc-over condition—without inhibiting its discharge—and to restore the viewer control values held in the data storage elements which may have been affected by the arc-over condition.

Referring to FIG. 4, radio frequency color television signals are received by antenna 408 and applied to the inner, intermediate frequency amplifier and detector circuitry 410. circuitry 410 includes conventional circuit elements and provides, at separate output terminals, baseband audio and baseband composite video signals. The baseband audio signals are applied to an audio processing unit (APU) 412. APU 412 may, for example, adjust the amplitude of the baseband audio signal according to viewer preferences for audio volume. In the present embodiment, a digital value corresponding to the audio volume level set by the viewer is applied to the APU 412 by the control microprocessor 440, described below. APU 412 applies a volume-adjusted signal to audio amplifier 414 which drives a loudspeaker 416 to reproduce the audio portin of a television program.

The baseband composite video signal from the circuitry 410 is applied to the analog-to-digital converter (ADC) 420. ADC 420 provides digital samples representing the composite video signal to video processing unit (VPU) 422, which, for example, separates the composite video signal into its luminance and chrominance components, adjust the brightness of the luminance component, adjusts the tint and saturation of the chrominance components and otherwise processes the luminance and chrominance components to produce luminance and (R−Y) and (B−Y) color difference signals. The adjustments to the luminance and chrominance components are controlled by digital values representing the viewer preferred values of brightness, tint and saturation applied to the VPU 422 by control microprocessor 440.

In the present embodiment, the viewer changes these values and the audio volume value via the viewer controls 450. Using these controls, the viewer may, for example, increment or decrement the values stored in the color saturation latch 442, the image brightness latch 444, the color tint latch 446, and the audio volume latch, 448. The latches 442 through 448 are, for example, registers of MOS flip-flops. Each of the latches 442 through 448 is periodically read by the microprocessor 440. Based on these values, microprocessor 440 adjusts the level of the audio signal being processed by APU 412, the level of the luminance signal and the level and phase of the chrominance signals being processed by VPU 422 to conform to the viewer preferences.

When power is applied to the television receiver shown in FIG. 4, the values held by the latches 442 through 448 may be zero or undefined. Shortly after power is applied, the power-on reset circuitry 454 generates a pulse which is applied to one input pin of OR gate 456 and, via gate 456 to a reset input pin of the control microprocessor 440. This pulse causes the microprocessor 440 to retrieve preset values for the saturation, brightness, tint and volume latches froman electronically erasable programmable read-only memory (EEPROM) 452 and to copy these values into the corresponding latches 442. through 448. The values held in EEPROM 452 may be set at the factory or they may be changed by the viewer to the adjusted values in the latches 442 through 448. To change the preset values in EEPROM 452, the viewer is provided with a preset switch in the viewer controls 450. This switch applies a pulse to the microprocessor 440 causing it to copy the values in the latches 442 through 448 into the corresponding storage cells of EEPROM 452.

VPU 422 applies the adjusted digital signals representing the luminance signal and the (R−Y) and (B−Y) color difference signals to a digital-to-analog converter (DAC) 423. In the present embodiment, DAC 423 and ADC 420 are incorporated within the same integrated circuit. DAC 423 also includes a matrix which converts the digital values representing the luminance signal and the (R−Y) and (B−Y) color difference signals into analog red, green and blue primary color signals and applies these analog signals to an RGB amplifier 424. RGB amplifier 424 develops the cathode drive signals which are applied to the base pins of the CRT. Accordingly, RGB amplifier 424 includes the transistor 33 and resistors 34, 35 and 41, as shown in FIG. 1.

ADC 420 also applies the digitized composite video signal to the deflection processing unit (DPU) 430. This circuitry, for example, separates the horizontal synchronization pulses from the composite video signal and generates a horizontal drive signal which is applied to the horizontal output circuit 432. DPU 430, microprocessor 440, APU 412, ADC 420 and VPU 422 may be commercially available integrated circuits such as the MAA 2500, MAA 2000, MAA 2400, MAA 2100 and MAA 2200 respectively manufactured by ITT Intermetal GmbH, Freiburg, West Germany. The circuitry 432 includes the horizontal output amplifier, horizontal output, or flyback, transformer and damper diode of a conventional television receiver. One of the signals provided by the horizontal output circuit 432 is a high voltage alternating current which is applied to the high voltage supply circuit 434. Circuit 434 rectifies the high voltage alternating current and develops the anode voltage for the CRT 21. As set forth above, this anode voltage is applied to the inner conductive coating 23 of the CRT 21 which forms one plate of the ultor capacitor. The outer conductive coating 24 of the CRT 21 is the second plate of the ultor capacitor. The outer coating 24 is coupled to the ground return base pin 37 of the CRT 21 by the conductors 38 and 38'. The base pin 37 is coupled to spark gaps $SG_1$, $SG_2$ and $SG_3$. In the present embodiment, these spark gaps protect the circuitry coupled to the cathode base pins of the CRT 21 from the high voltages and currents which may flow during a CRT arc-over. The spark gaps conduct the arc-over current to the outer conductive coating 24 via the conductors 38 and 38' and the chassis ground via conductor 39.

The circuitry used to detect the CRT arc-over condition includes ferrite torroid 460, diode 462, resistor 464, capacitor 466 and zener diode 468. The conductor 38 passes through the torroid 460 and acts as the primary winding of a pulse transformer 461. The secondary winding of the pulse transformer consists, for example, of two turns of wire wrapped around the torroid. One end of the secondary winding is connected to ground and the other end is connected to the anode terminal of a diode 462.

When a CRT arc-over condition occurs, a current flows through the conductor 38 from, for example, the spark gap $SG_1$ to the outer conductive coating 24 of CRT 21. This current induces a similar current in the secondary winding of the pulse transformer 461. The current in the secondary winding is rectified by the diode 462. A resistor 464, connected between the anode terminal of the diode 462 and the first terminal of a capacitor 466, attenuates the current flow that charges the capacitor 466, the second terminal of which is mounted to ground. Zener diode 468 is connected in parallel with capacitor 466 with its cathode terminal connected to ground. The interconnected first terminal of the capacitor 466 and anode terminal of zener diode 468 are also connected to the second input terminal of OR gate 456. Diode 468 acts to limit the voltage developed across the capacitor 466 to prevent damage to OR gate 456. By appropriate choice of component values, the CRT arc-over detection circuit described above, may be designed to produce a pulse at the input of OR gate 456 which has sufficient amplitude and duration to propagate through gate 456 to the reset input terminal of control microprocessor 440. This pulse causes the microprocessor to restore the values in the latches 442 through 448 from the EEPROM 452 as set forth above in reference to the power on reset function.

The CRT arc-over sensing circuit is coupled to only one of the conductors 38 and 38' which connect the ground return base pin 37 to the outer conductive coating 24 of CRT 21. This configuration leaves a low impedance path via conductor 38' for the rapid discharge of arc-over currents. Without this discharge path, the additional impedance in the direct current path between the ground base pin 37 and the ultor current return terminals of the outer coating 24 caused by the torroid 460, may allow a large potential to develop at the base pins of the CRT. This potential may be of sufficient magnitude to harm the energizing circuitry connected to these base pins.

It is contemplated that other circuitry may be used to detect CRT arc-over conditions. For example, circuitry (not shown) may be coupled to the high voltage supply 434 which would sense a sudden drop in its output potential caused by CRT arc-over and provide an output pulse to OR gate 456.

To summarize the operation of the described embodiment, a CRT arc-over condition produces a large current pulse which, when it discharges via the chassis ground, disrupts the reference ground potentials of other circuitry coupled to the chassis ground. The affected circuitry includes digital data storage elements which may experience random state changes caused by the fluctuating ground potential. The CRT arc-over condition is detected by circuitry which applies a pulse to the reset terminal of the microprocessor, causing it to restore the potentially corrupted data in the data storage elements using preset data stored in a less volatile programmable read only memory.

What is claimed is:

1. In a television display system including a cathode ray tube and a digital data storage element which may be subject to random changes in state resulting in corruption of the data stored therein caused by arc-over in said cathode ray tube, apparatus comprising:
   means coupled to said cathode ray tube for generating a control signal on the coccurrence of an arc-over in said cathode ray tube; and
   fault recovery means including means coupled to said digital data storage element and responsive to said control signal for changing the data held by said digital data storage element to a predetermined value.

2. The apparatus set forth in claim 1 further comprising power-on pulse generating means for generating a pulse signal when power is applied to the television display system and wherein said fault recovery means includes means responsive to said control signal and to said power-on pulse signal for changing the data held by said digital data storage element to said predetermined value.

3. The apparatus set forth in claim 1 wherein:
   said fault recovery means further includes data storage means for holding said predetermined value, said data storage means being relatively unaffected by arc-over in said cathode ray tube; and
   said means for changing the data held by said digital data storage element includes means for copying the value from said data storage means to said digital data storage element.

4. The apparatus set forth in claim 1 wherein said cathode ray tube includes an ultor capacitor having first and second plates, an electrode for coupling a source of high voltage to said first plate, an energizing electrode, a base pin coupled to said energizing electrode, a ground return base pin, means coupling said energizing electrode base pin to said ground return base pin for discharging excess current applied to said energizing electrode during arc-over between the first plate of said ultor capacitor and said energizing electrode, and ultor current return means coupled between said ground return base pin and the second electrode of said ultor capacitor for returning said excess current to said ultor capacitor and wherein said control signal generating means comprises:
   means coupled to said ultor current return means for generating a signal indicative of a rapid increase in the current flow therethrough.

5. In a television display system including a cathode ray tube, a digital data storage element, and means for changing the data held in said digital data storage element wherein the digital data storage element may be subject to random changes in state resulting in corruption of the data stored therein caused by arc-over in said cathode ray tube, apparatus comprising:
   means coupled to said cathode ray tube for sensing a current flow caused by an arc-over in said cathode ray tube to generate a control signal on the occurrence of the arc-over in said cathode ray tube;
   data storage means for holding a digital value and being relatively unaffected by arc-over in said cathode ray tube;
   means coupled to said digital data storage element and to said data storage means for selectively copying digital values from said digital storage element to said data storage means;
   fault recovery means including means coupled to said digital data storage element and responsive to said control signal for copying digital data values from said data storage means to said digital data storage element.

6. The apparatus set forth in claim 5 further comprising power-on pulse generating means for generating a pulse signal when power is applied to the television display system and wherein said fault recovery means includes means responsive to said control signal and to said power-on pulse signal for copying digital data values from said data storage means to said digital data storage element.

7. The apparatus set forth in claim 6 wherein:
   said digital data storage element comprises a plurality of metal-oxide semiconductor flip-flops;
   said data storage means comprises an electronically erasable programmable read-only memory; and
   said means for copying digital data values from said data storage means to said digital data storage element includes a microprocessor.

8. In a television display system including: a cathode ray tube having an ultor capacitor which has first and second plates, an electrode for coupling a source of high voltage to said first plate, an energizing electrode, a base pin coupled to said energizing electrode and a ground return base pin; a digital data storage element; and means for changing the data held in said digital data storage element, wherein the digital data storage element may be subject to random changes in state resulting in corruption of the data stored therein caused by arc-over between the first plate of the ultor capacitor and the energizing electrode of said cathode ray tube, apparatus comprising:

means for coupling said energizing electrode base pin to said ground return base pin for discharging excess current applied to said energizing electrode during said arc-over;

a transformer including:
        a primary winding having a first terminal coupled to said ground return base pin and a second terminal coupled to the second plate of said ultor capacitor, for providing an ultor current return path for said excess current; and
        a secondary winding having a first terminal coupled to a source of reference potential for providing, at a second terminal, an alternating current signal with respect to said reference potential indicative of the magnitude of the current flow through said primary winding;

a rectifier, coupled to the second terminal of the secondary winding of said transformer for converting said alternating current signal into a direct current signal;

a capacitor coupled between said rectifier and said source of reference potential for being charged by said direct current signal to provide a control potential indicative of the occurrence of an arc-over in the cathode ray tube; and fault recovery means including means coupled to said digital data storage element and responsive to said control potential for changing the data held by said digital data storage element to a predetermined value.

9. The apparatus set forth in claim 8 further comprising power on pulse generating means for generating a pulse signal when power is applied to the television display system and wherein said fault recovery means includes means responsive to said control potential and to said power-on pulse signal for changing the data held by said digital data storage element to said predetermined value.

10. The apparatus set forth in claim 9 wherein:
said fault recovery means further includes data storage means for holding said predetermined value, said data storage means being relatively unaffected by arc-over in said cathode ray tube; and
said means for changing the data held by said digital data storage element incldes means for copying the value from said data storage means to said digital data storage element.

11. The apparatus set forth in claim 10 wherein:
said digital data storage element comprises a plurality of metal-oxide semiconductor flip-flops;
said data storage means comprises a programmable read-only memory; and
said means for copying digital data values from said data storage means to said digital data storage element includes a microprocessor.

* * * * *

UNITED STATES PATENT AND TRADEMARK OFFICE
CERTIFICATE OF CORRECTION

PATENT NO. : 4,654,717

DATED : March 31, 1987

INVENTOR(S) : John W. Stoughton

It is certified that error appears in the above-identified patent and that said Letters Patent is hereby corrected as shown below:

Column 6, line 59    "mounted" should be --connected--.
Column 7, line 47    "coccurrence" should be --occurrence--.

Signed and Sealed this

Twenty-second Day of September, 1987

Attest:

DONALD J. QUIGG

Attesting Officer    Commissioner of Patents and Trademarks